United States Patent
Indo

(10) Patent No.: US 8,269,853 B2
(45) Date of Patent: Sep. 18, 2012

(54) IMAGING APPARATUS

(75) Inventor: Masanari Indo, Yokohama (JP)

(73) Assignee: Nikon Corporation, Tokyo (JP)

( * ) Notice: Subject to any disclaimer, the term of this patent is extended or adjusted under 35 U.S.C. 154(b) by 417 days.

(21) Appl. No.: 12/711,860

(22) Filed: Feb. 24, 2010

(65) Prior Publication Data

US 2010/0271538 A1    Oct. 28, 2010

(30) Foreign Application Priority Data

Feb. 25, 2009    (JP) ................... 2009-041805

(51) Int. Cl.
*H04N 9/73*      (2006.01)
*H04N 5/222*     (2006.01)
*G03B 7/00*      (2006.01)

(52) U.S. Cl. .............. 348/227.1; 348/226.1; 348/370; 348/371; 396/213

(58) Field of Classification Search ................ 348/226, 348/227.1, 228.1, 370, 371; 396/213–262; 356/451–456
See application file for complete search history.

(56) References Cited

U.S. PATENT DOCUMENTS

| | | | | |
|---|---|---|---|---|
| 4,742,236 A * | 5/1988 | Kawakami et al. | ........... | 250/554 |
| 8,040,392 B2 * | 10/2011 | Ono et al. | ................. | 348/226.1 |
| 8,100,531 B2 * | 1/2012 | Liesfeld et al. | ............... | 351/207 |
| 2005/0231632 A1 * | 10/2005 | Sekikawa et al. | ............. | 348/370 |
| 2006/0197846 A1 * | 9/2006 | Nose | .......................... | 348/226.1 |
| 2006/0232686 A1 * | 10/2006 | Ono et al. | ................. | 348/226.1 |
| 2006/0232687 A1 * | 10/2006 | Ono et al. | ................. | 348/226.1 |
| 2006/0256208 A1 * | 11/2006 | Ono et al. | ................. | 348/227.1 |
| 2008/0101721 A1 * | 5/2008 | Mori | ............................ | 382/275 |
| 2009/0051782 A1 * | 2/2009 | Ono et al. | ................. | 348/226.1 |
| 2009/0284615 A1 * | 11/2009 | Chen | ........................ | 348/226.1 |
| 2010/0045819 A1 * | 2/2010 | Pillman et al. | ............. | 348/226.1 |
| 2012/0002074 A1 * | 1/2012 | Baba et al. | ................. | 348/228.1 |

FOREIGN PATENT DOCUMENTS

JP     A-2008-109370     5/2008

* cited by examiner

*Primary Examiner* — Aung S Moe
*Assistant Examiner* — Chia-Wei A Chen
(74) *Attorney, Agent, or Firm* — Oliff & Berridge, PLC

(57) ABSTRACT

An imaging apparatus includes: an image sensor including a plurality of charge storage-type photoelectric conversion elements disposed along a first and a second direction; a rolling shutter control unit that executes storage control to store electrical charges in a first element row and in a second element row with different timing for electrical charging, the first element row including a plurality of the charge storage-type photoelectric conversion elements along the first direction and the second element row including a plurality of the charge storage-type photoelectric conversion elements along the first direction at a different position along the second direction; a detection unit that detects light emission timing indicating a light emission cycle of each of a plurality of color components in light entering the image sensor; and a start instruction unit that engages the rolling shutter control unit to start the storage control based upon the light emission timing.

14 Claims, 5 Drawing Sheets

IMAGING APPARATUS

INCORPORATION BY REFERENCE

The disclosure of the following priority application is herein incorporated by reference:
Japanese Patent Application No. 2009-041805 filed Feb. 25, 2009

BACKGROUND OF THE INVENTION

1. Field of the Invention

The present invention relates to an imaging apparatus and imaging method.

2. Description of Related Art

Japanese Laid Open Patent Publication No. 2008-109370 discloses a flicker-correction technology that enables correction of flickering which occurs during imaging operation executed with exposure at a given line in an image sensor executed with timing different from the timing with which exposure is executed at another line in the image sensor under illumination provided by, for instance, a fluorescent lamp ON control for which is achieved by a commercial AC power source.

SUMMARY OF THE INVENTION

There is an issue to be addressed in the flicker-correction technology in that the load of the corrective arithmetic operation executed to correct the adverse effect of a flickering phenomenon that has already manifested is bound to be significant.

According to the 1st aspect of the present invention, an imaging apparatus comprises: an image sensor equipped with a plurality of charge storage-type photoelectric conversion elements disposed along a first direction and a second direction intersecting the first direction; a rolling shutter control unit that executes storage control so as to store electrical charges in a first element row and in a second element row with different timing for electrical charging, the first element row being made up with a plurality of the charge storage-type photoelectric conversion elements disposed along the first direction and the second element row being made up with a plurality of the charge storage-type photoelectric conversion elements disposed along the first direction at a different position along the second direction; a detection unit that detects light emission timing indicating a light emission cycle corresponding to each of a plurality of color components contained in light entering the image sensor; and a start instruction unit that engages the rolling shutter control unit to start the storage control based upon the light emission timing.

According to the 2nd aspect of the present invention, in the imaging apparatus according to the 1st aspect, the detection unit may detect the light emission timing in correspondence to each of the plurality of color component based upon an output from a non-storage-type photoelectric conversion element.

According to the 3rd aspect of the present invention, in the imaging apparatus according to the 1st aspect, the start instruction unit may issue an instruction for the rolling shutter control unit to start the storage control so as to execute the storage control substantially halfway through the light emission cycle of the color component with a shortest light emission cycle among the plurality of the color components.

According to the 4th aspect of the present invention, in the imaging apparatus according to the 1st aspect, when the light emission cycle of the color component with a shortest light emission cycle among the plurality of the color components is longer than an exposure period at the image sensor, the start instruction unit may issue an instruction for the rolling shutter control unit to start the storage control.

According to the 5th aspect of the present invention, in the imaging apparatus according to the 1st aspect, the start instruction unit may also offset start timing with which the instruction for the rolling shutter control unit to start the storage control is issued.

According to the 6th aspect of the present invention, in the imaging apparatus according to the 5th aspect, the start instruction unit may adjust the start timing so as to avoid any period of time during which the light emission cycles of the plurality of the color components do not overlap.

According to the 7th aspect of the present invention, in the imaging apparatus according to the 5th aspect, the start instruction unit may adjust the start timing in response to an operation signal output from an operation member.

DESCRIPTION OF PREFERRED EMBODIMENT

Figure 1:
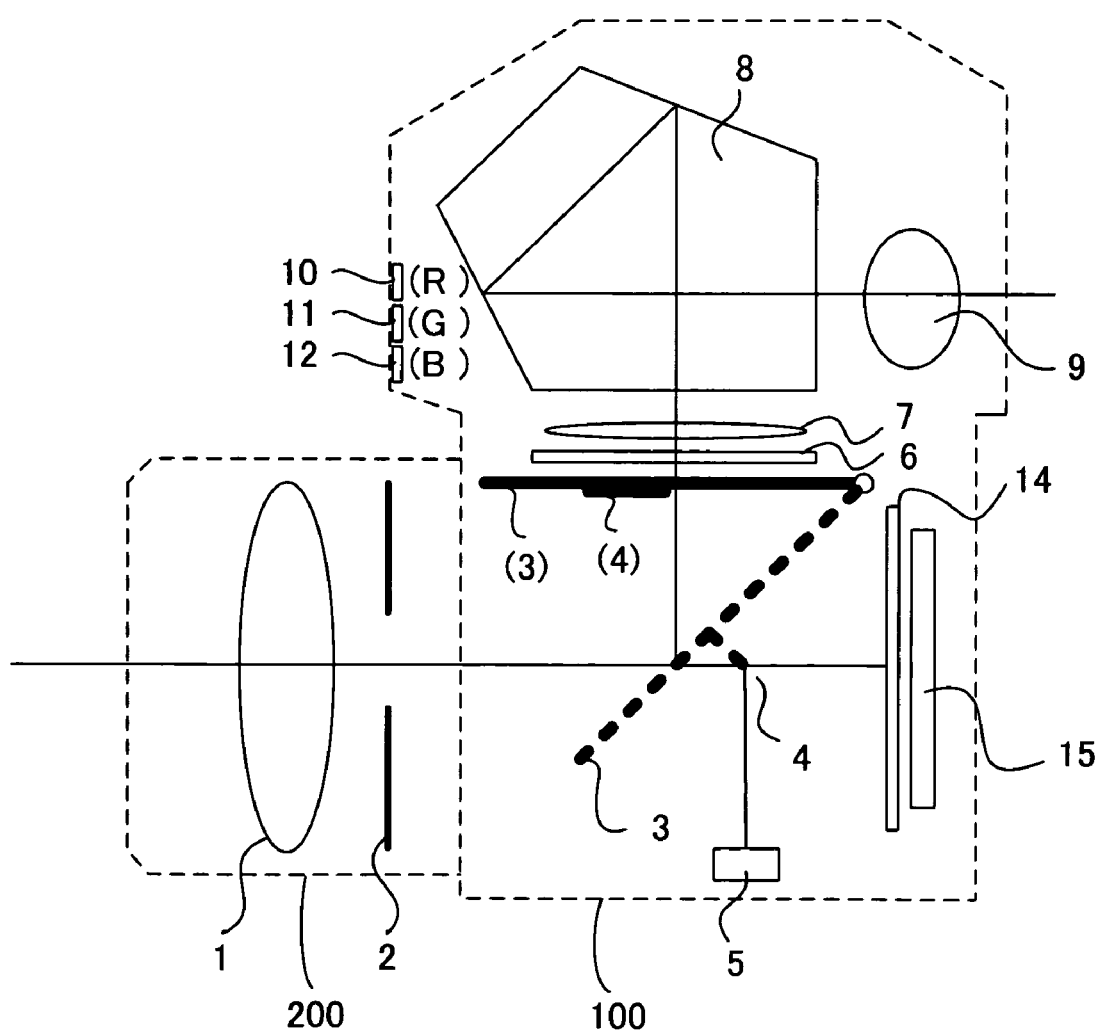
FIG. 1 illustrates the essential structural components of the electronic camera achieved in an embodiment of the present invention.

The following is a description of an embodiment of the present invention given in reference to the drawings. FIG. 1 illustrates the essential components of the electronic camera achieved in the embodiment of the present invention. FIG. 1 shows a lens barrel 200 interchangeably mounted at a camera body 100.

Light from a subject enters the camera body 100 via a photographic optical system 1 and an aperture 2 at the lens barrel 200. The subject light having entered the camera body 100 is guided via a quick return mirror (hereafter referred to as a main mirror) 3, assuming the position indicated by the dotted line prior to a shutter release, upward toward a viewfinder unit and forms an image on a diffusing screen 6. In addition, part of the subject light having entered the camera body 100 is reflected downward at a sub mirror 4 and enters a rangefinder 5. A signal output from the rangefinder 5 is used in focus detection processing executed to detect the focusing condition achieved via the lens barrel 200.

The subject light having formed an image on the diffusing screen 6 then enters a pentaprism 8 via a condenser lens 7. The pentaprism 8 guides the subject light having entered therein toward an eyepiece lens 9.

Following a shutter release, the main mirror 3 swings to the position indicated by the solid line and thus, the subject light is guided via a focal plane shutter 14 to an image sensor 15 where it forms a subject image on the imaging surface thereof. The image sensor 15 may be constituted with, for instance, a CMOS image sensor equipped with a plurality of charge storage-type photoelectric conversion elements each disposed in correspondence to a pixel. The image sensor 15 captures the subject image formed on the imaging surface and outputs photoelectric conversion signals corresponding to the brightness of the subject image.

The image sensor 15 has an electronic shutter function which enables it to execute exposure control for the individual pixels through the rolling shutter method. In the rolling shutter method, the timing with which the pixels are exposed and data are read out from the pixels (storage control timing) varies from one pixel row (horizontal line) made up with pixels disposed side-by-side along the horizontal direction on the imaging surface from another pixel row. The shutter control is to be described in detail later.

An optical sensor 10 is constituted with a photo transistor that receives outside light through a filter that allows R-color component light to be transmitted through and blocks other color component light. An optical sensor 11 is constituted with a photo transistor that receives outside light through a filter that allows G-color component light to be transmitted through and blocks other color component light. An optical sensor 12 is constituted with a photo transistor that receives outside light through a filter that allows B-color component light to be transmitted through and blocks other color component light.

Measures are taken in the electronic camera achieved in the embodiment in order to prevent coloration, which tends to occur in a photographic image captured under illuminating light provided by a fluorescent lamp. On control for this fluorescent lamp is achieved via an AC power source at commercial frequency (non-inverter system). In other words, the illuminating light is provided by a fluorescent lamp that alternates between an ON state and an OFF state (i.e., flickers) at a frequency twice that of commercial frequency (e.g., at a frequency of 100 Hz when a commercial AC power source with a frequency of 50 Hz is used).

Figure 2:
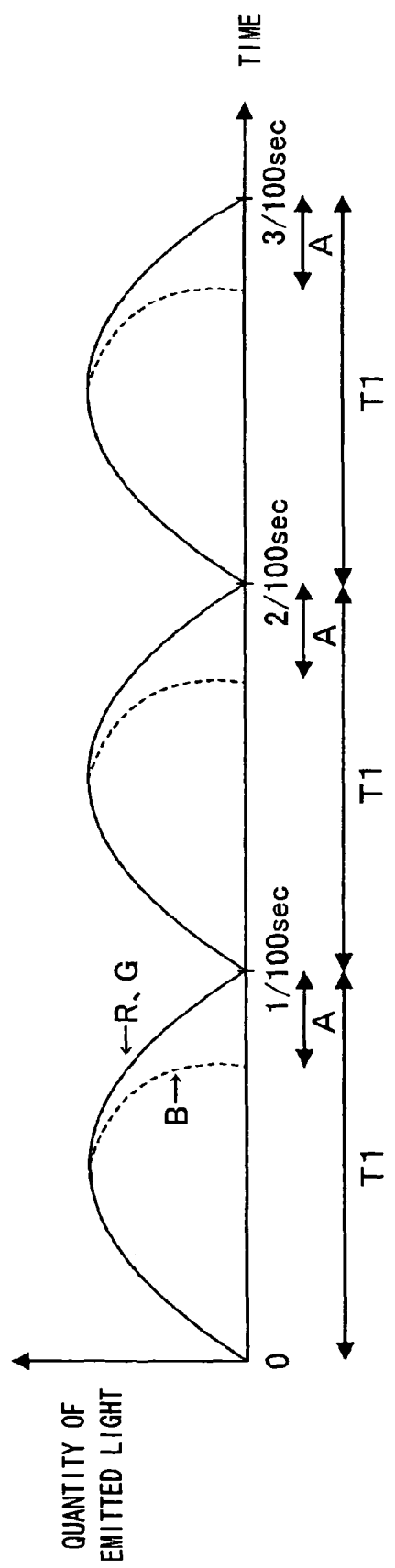
FIG. 2 presents an example of characteristics that may be observed with regard to the amount of illuminating light provided by a fluorescent lamp.

FIG. 2 presents an example of characteristics that may be observed with regard to the quantity of illuminating light provided by the fluorescent lamp. In FIG. 2, time is indicated along the horizontal axis and the quantity of emitted light is indicated along the vertical axis. In the example presented in FIG. 2, R-color component light, G-color component light and B-color component light are all emitted with a 1/100 sec cycle. The afterglow time of the B-color component light is different from the afterglow time of the R-color component light and the G-color component light, and the afterglow of the B-color component light decays faster than the afterglow of the other color light components.

If exposure and charge storage are executed at the image sensor 15 over the time block A in FIG. 2 under the rolling shutter control executed under illuminating light provided by the fluorescent lamp, the quantity of light emitted from which fluctuates cyclically as described above, the resulting data read out from the image sensor 15 will not include any B-color component data. In such as case, "coloration" is bound to occur. The following explanation focuses on shutter control executed to prevent such coloration.

Figure 3:
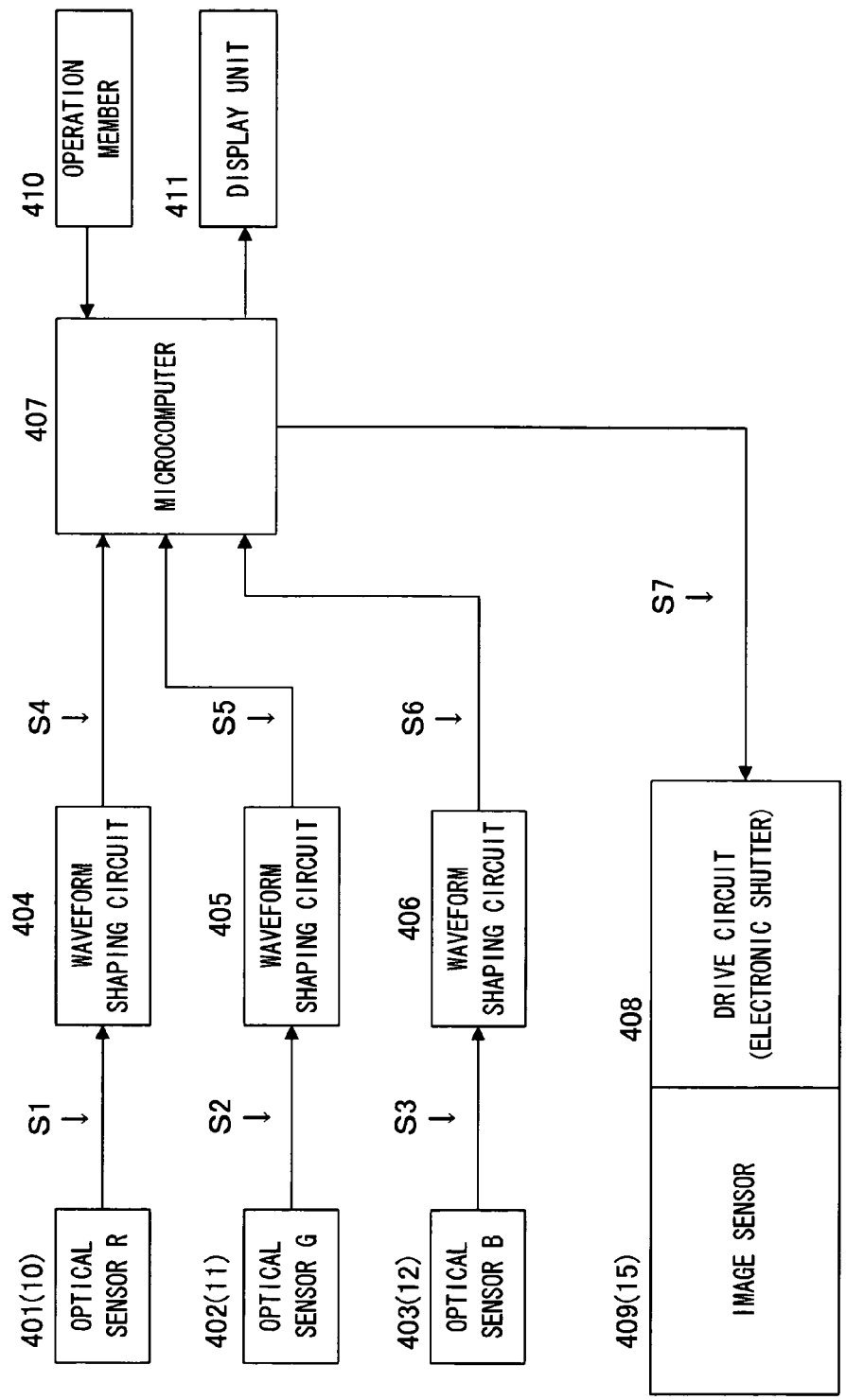
FIG. 3 shows structural components that may be needed in shutter control.

FIG. 3 shows structural components that may be required when executing the shutter control in the embodiment. Optical sensors 401~403 in FIG. 3 respectively correspond to the optical sensors 10~12 in FIG. 1.

Upon receiving R-color component light, the optical sensor 401 outputs a photoelectric conversion signal that changes cyclically to a waveform shaping circuit 404 via a path S1. Based upon the cyclical signal input thereto, the waveform shaping circuit 404 generates and outputs a cyclical pulse signal indicating the R-color light extinction timing.

Upon receiving G-color component light, the optical sensor 402 outputs a photoelectric conversion signal that changes cyclically to a waveform shaping circuit 405 via a path S2. Based upon the cyclical signal input thereto, the waveform shaping circuit 405 generates and outputs a cyclical pulse signal indicating the G-color light extinction timing.

Upon receiving B-color component light, the optical sensor 403 outputs a photoelectric conversion signal that changes cyclically to a waveform shaping circuit 406 via a path S3. Based upon the cyclical signal input thereto, the waveform shaping circuit 406 generates and outputs a cyclical pulse signal indicating the B-color light extinction timing.

The pulse signals output from the waveform shaping circuit 404 through the waveform shaping circuit 406 are provided to a microcomputer 407 via paths S4~S6 respectively. Based upon the three pulse signals provided from the waveform shaping circuit 404~406, the microcomputer 407 issues an instruction for a drive circuit 408 indicating the timing (charge storage timing) with which the shutter control must be executed. The microcomputer 407 also issues an instruction for a shutter drive circuit (not shown) to execute open/close control for the focal plane shutter 14.

Figure 4:
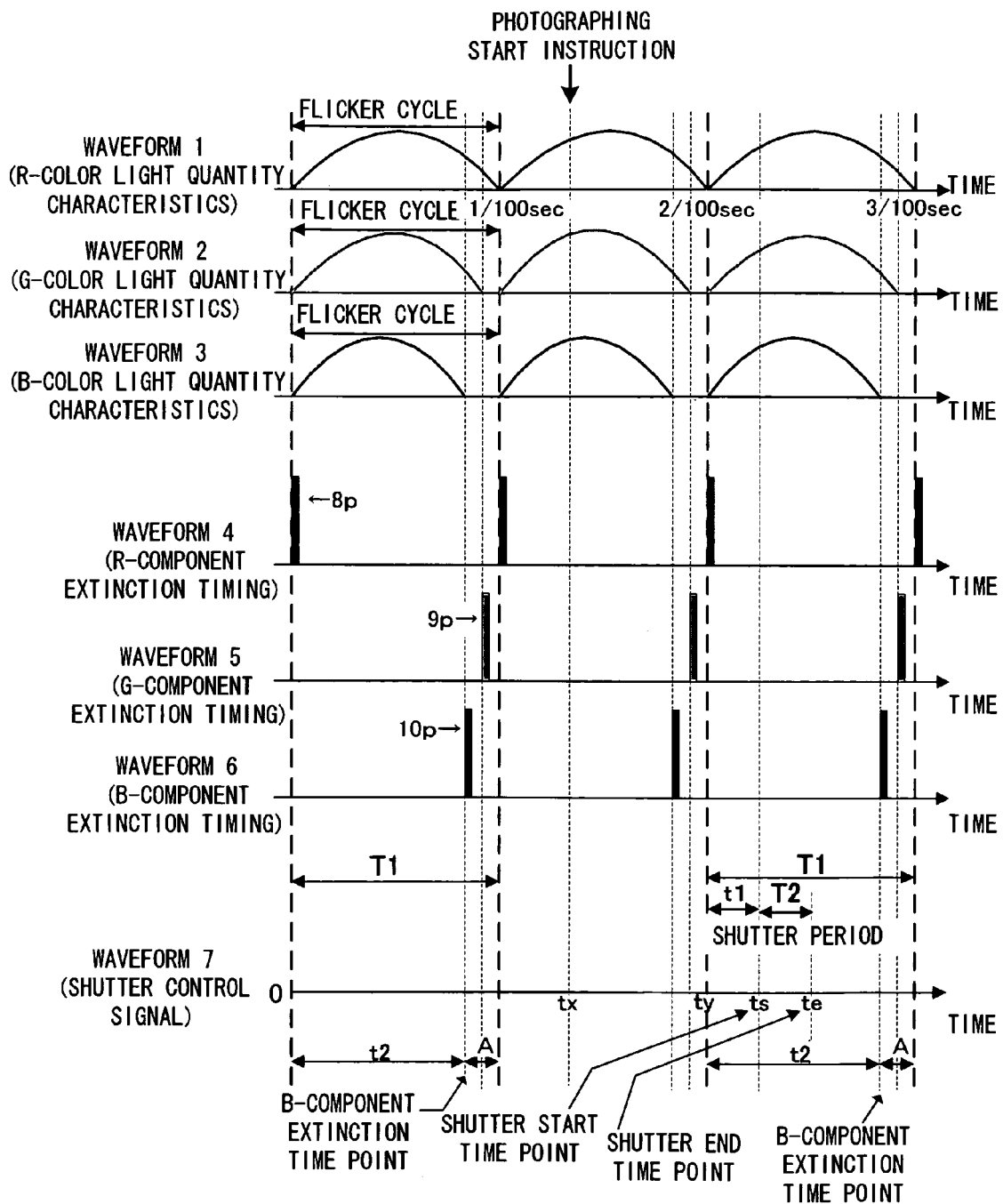
FIG. 4 presents a time chart pertaining to the shutter control.

Based upon the indicated timing, the drive circuit 408 generates a drive signal to be used to drive an image sensor 409 and executes rolling shutter control for the image sensor 409. The image sensor 409 corresponds to the image sensor 15 in FIG. 1. FIG. 4 presents a timing chart of the shutter control executed in the embodiment. It is to be noted that in the example of the shutter control presented in FIG. 4, the R-color light extinction timing and the G-color light extinction timing do not match either (i.e., the R-color light afterglow time and the G-color light afterglow time are not the same).

FIG. 4 indicates that the fluorescent lamp alternates between light emission and extinction over 1/100 sec cycles. Waveforms 1~3 are the waveforms of the outputs from the optical sensors 401~403 respectively. The cyclical waveform 1 indicates the characteristics pertaining to the quantity of R-color light that is received. The cyclical waveform 2 indicates the characteristics pertaining to the quantity of G-color light that is received. The cyclical waveform 3 indicates the characteristics pertaining to the quantity of B-color light that is received. Among the R-color light, the G-color light and the B-color light, the R-color light assumes the longest afterglow time of 1/100 sec. This afterglow time is hereafter referred to as a flicker cycle T1. In the example, the timing with which the R-color light decays matches the timing with which light is emitted for the next cycle.

The G-color light afterglow time is shorter than the flicker cycle T1. In other words, the G-color light decays faster than the R-color light. The B-color light afterglow time is shorter than the G-color light afterglow time. In other words, the B-color light decays faster than the G-color light.

Waveform 4 is the waveform of a cyclical pulse signal string 8p indicating the R-color light extinction timing and the R-color light emission timing, output from the waveform shaping circuit 404. The waveform 5 is the waveform of a cyclical pulse signal string 9p indicating the G-color light extinction timing and the G-color light emission timing, output from the waveform shaping circuit 405. Waveform 6 is the waveform of a cyclical pulse signal string 10p indicating the B-color light extinction timing and the B-color light emission timing, output from the waveform shaping circuit 406.

Based upon the timing of the leading edges of the three pulse signals output from the waveform shaping circuits 404~406, the microcomputer 407 (see FIG. 3) generates timing for the shutter control as described below. FIG. 4 indicates that as a shutter release button (not shown) is pressed down at the electronic camera, a photographing start instruction is input to the microcomputer 407 at a time point tx. The period of time elapsing between a shutter start time point ts and a shutter end time point te is referred to as a shutter period t2 and the shortest afterglow time (the B-color light afterglow time in this example), among the afterglow times corresponding to the three different color components explained above is referred to as t2.

Figure 5:
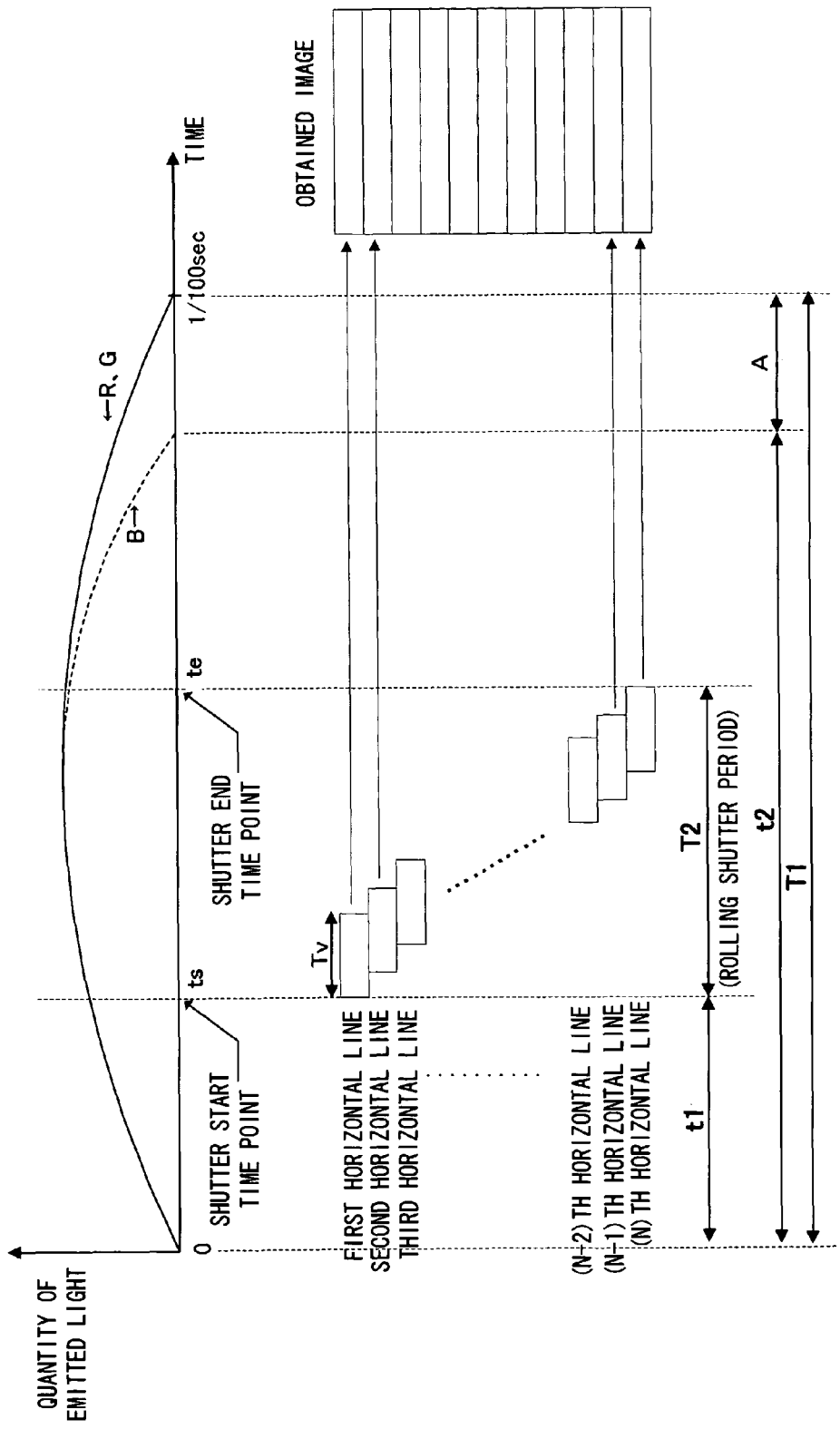
FIG. 5 illustrates an example of rolling shutter control.

FIG. 5 illustrates an example of rolling shutter control in the chart indicating the control executed over a 1/100-sec period elapsing between the time point 2/100 sec and the time point 3/100 sec in FIG. 4. FIG. 5 shows that the exposure•readout at the image sensor 15 is controlled so that a first horizontal line through an Nth horizontal line are individually exposed and the data therein are read out individually by offsetting the exposure•readout timing. The exposure readout start time point (start timing) for the first horizontal line matches the shutter start time point ts, whereas the exposure•readout end time point for the Nth horizontal line matches the shutter end time point te. The exposure period SH during which each horizontal line is exposed corresponds to the shutter speed (time period) set in the electronic camera. The shutter speed Tv is set through a shutter speed setting operation performed by the photographer when the electronic camera is set in a shutter speed priority auto mode or a manual mode. When the electronic camera is set in an aperture priority auto mode or a program auto mode, however, the shutter speed is determined through an auto exposure calculation of the known art executed by the microcomputer 407.

The length of the shutter period T2 elapsing between the rolling shutter control start time point (ts) i.e., the start timing, and the rolling shutter control end time point (te) changes in correspondence to the shutter speed Tv and the number of horizontal lines. Namely, when there is a greater number (N) of horizontal lines, the shutter period T2 lasts longer and also, when the shutter speed Tv is slower, the shutter period T2 lasts longer. In addition, when the exposure•readout timing for each horizontal line is offset by a greater extent relative to the exposure•readout timing for the preceding horizontal line, the shutter period T2 lasts longer.

When t2>T2 is true, the microcomputer 407 sets the shutter start time point ts at a point in time that follows a period of time T1, the length of which is calculated as expressed in (1) below, following the R-color light extinction (emission) that occurs with the timing ty immediately after the photographing start instruction time point tx. As explained earlier, the R-color light has the longest afterglow time among the R-color light, the G-color light and the B-color light $$t1 = (t2 - T2)/2 \quad (1)$$

It is to be noted that if the length of time elapsing between the photographing start instruction time point tx and the subsequent R-color light extinction (emission) timing T1 is less than a predetermined value (e.g., 5/1000 sec), the timing with which the second R-color light extinction (emission), following the R-color light extinction immediately after the time point tx occurs, may be designated as ty.

The microcomputer 407 sets the shutter end time point te at a point in time that follows the shutter period T2 elapsing after the shutter start time point ts. Namely, it outputs an instruction for the drive circuit 408 so as to execute the rolling shutter control, an example of which is presented in FIG. 5, during the period of time elapsing between the shutter start time point ts and the shutter end time point te.

In addition, the microcomputer 407 issues an instruction for the shutter drive circuit (not shown) to open the focal plane shutter 14 by the shutter start time point ts and close the focal plane shutter 14 at the shutter end time point te.

Waveform 7 in FIG. 4 is the waveform of the shutter control signal based upon which the shutter control is executed as described above. Under the shutter control described above, the shutter period (rolling shutter period) T2 is set substantially halfway through an afterglow time during which the R-color component light, the G-color component light and the B-color component light are all emitted from the fluorescent lamp, as indicate in FIG. 5. As a result, the exposure•readout for each horizontal line is executed while the R-color component light, the G-color component light and the B-color component light are all emitted from the fluorescent lamp.

The following advantages are achieved through the embodiment described above.

(1) The electronic camera includes the microcomputer 407 and the image sensor 15 equipped with a plurality of charge storage-type photoelectric conversion elements arrayed along the horizontal direction and also along the vertical direction running perpendicular to the horizontal direction. The microcomputer 407 engages the drive circuit 408 in rolling shutter control under which electrical charges are stored in a first horizontal line made up with a plurality of charge storage-type photoelectric conversion elements disposed side-by-side along the horizontal direction at the image sensor 15 with timing different from the timing with which electrical charges are stored in a second horizontal line, assuming a position different from that of the first horizontal line along the vertical direction, made up with a plurality of charge storage-type photoelectric conversion elements disposed side-by-side along the horizontal direction. In addition, the microcomputer 407 detects the light emission timing indicating the light emission cycles for each of the plurality of color components R, G and B constituting the light entering the image sensor 15, and initiates the storage control based upon the light emission timing thus detected. Through these measures, any undesirable coloration, which would otherwise occur due to flickering manifesting under the rolling shutter control, can be prevented in an optimal manner. There is an added advantage in that since no corrective arithmetic operation needs to be executed, the load placed on the microcomputer 407 is reduced.

(2) The microcomputer 407, which detects light emission timing in correspondence to the individual color components R, G and B based upon the outputs from the non-storage type optical sensors 401, 402 and 403, is able to detect the light emission timing in real time without having to allow extra time for storage at the sensors.

(3) The microcomputer 407 issues an instruction for the drive circuit 408 to start storage control so that storage control is executed substantially halfway through the light emission cycle of the B-color component light with the shortest light emission cycle (afterglow time) among the R-color component light, the G-color component light and the B-color component light. By executing the storage control while a large quantity of B-color component light is being emitted, it is ensured that the data read out from the image sensor 15 will contain B-color component data and, as a result, any occurrence of the "coloration" phenomenon, attributable to the absence of the B-color component data in the data read out from the image sensor, can be effectively prevented.

(4) The microcomputer 407 issues an instruction for the drive circuit 408 to start the storage control if the light emission cycle t2 of the B-color component light with the shortest light emission cycle (afterglow time) among the R-color component light, the G-color component light and the B-color component light, is longer than the exposure period T2 and thus, any occurrence of the "coloration" phenomenon can be effectively prevented.

(5) The start time point is for the exposure period T2 is set at a point in time occurring following the period of time t1, which elapses after the R-color light with the longest light emission cycle (afterglow time) among the R-color component light, the G-color component light and the B-color component light is emitted with the specific timing ty immediately after the photographing start instruction time point tx. By allowing the period of time t1 to elapse, it is ensured that the exposure period T2 starts only after the quantity of light emitted from the fluorescent lamp increases to a sufficient level and as a result, a brighter image, compared to an image captured by starting the exposure period T2 with the timing ty, can be obtained.

(Variation 1)

While the embodiment is described above in reference to an example in which the B-color light has a shorter afterglow time, the R-color light or the G-color light may have a shorter afterglow time depending upon the type of fluorescent lamp in use. In such a case, t2 should be set in correspondence to the shortest afterglow time of the R-color light or the G-color light.

(Variation 2)

The value representing the length of time t1 calculated as expressed in (1) may be adjusted in response to a user instruction. In such a case, the microcomputer 407 may bring up on display a menu operation screen at a display unit 411 (see FIG. 3) and if the user selects an "adjust shutter period start time point" option in the menu operation screen, it may further bring up an "adjustment screen" on display at the display unit 411. The value representing the length of time T1 can then be increased or decreased in response to an operation signal output from the operation member 410. These measures will allow the rolling shutter control to be executed with the timing desired by the user.

(Variation 3)

While the embodiment is described above in reference to an example in which the present invention is adopted in a single lens reflex electronic camera, the present invention may instead be adopted in an electronic camera other than a single lens reflex electronic camera. In addition, the present invention may be adopted in an electronic camera that does not include a focal plane shutter 14.

(Variation 4)

While the exposure readout control executed for the image sensor 15 constituted with a CMOS image sensor is described in reference to the embodiment, the present invention may also be adopted in conjunction with an image sensor 15 constituted with a CCD image sensor. In such a case, the storage period at the CCD image sensor should be set as the shutter period T2. In addition, the open/close control for the focal plane shutter 14 should be executed so as to achieve slit exposure by allowing a horizontal slit opening formed with the blades of the focal plane shutter 14 to move along the vertical direction over the imaging surface of the CMOS image sensor. The length of the slit exposure period corresponds to the shutter speed Tv.

Through these measures, the storage operation executed at the image sensor 15 is controlled so as to expose each horizontal row (horizontal line) of pixels set side-by-side along the horizontal direction at the imaging surface of the CCD image sensor with timing different from the exposure timing for other horizontal lines. In variation 4, the exposure period for each horizontal line is controlled so that exposure is completed over Tv during the CCD image sensor storage period T2.

The above described embodiment is an example and various modifications can be made without departing from the scope of the invention.

What is claimed is:

1. An imaging apparatus, comprising:
an image sensor equipped with a plurality of charge storage-type photoelectric conversion elements disposed along a first direction and a second direction intersecting the first direction;
a rolling shutter control unit that executes storage control so as to store electrical charges in a first element row and in a second element row with different timing for electrical charging, the first element row being made up with a plurality of the charge storage-type photoelectric conversion elements disposed along the first direction and the second element row being made up with a plurality of the charge storage-type photoelectric conversion elements disposed along the first direction at a different position along the second direction;
a detection unit that detects light emission timing indicating a light emission cycle corresponding to each of a plurality of color components contained in light entering the image sensor; and
a start instruction unit that engages the rolling shutter control unit to start the storage control based upon the light emission timing.

2. An imaging apparatus according to claim 1, wherein:
the detection unit detects the light emission timing in correspondence to each of the plurality of color component based upon an output from a non-storage-type photoelectric conversion element.

3. An imaging apparatus according to claim 1, wherein:
the start instruction unit issues an instruction for the rolling shutter control unit to start the storage control so as to execute the storage control substantially halfway through the light emission cycle of the color component with a shortest light emission cycle among the plurality of the color components.

4. An imaging apparatus according to claim 1, wherein:
when the light emission cycle of the color component with a shortest light emission cycle among the plurality of the color components is longer than an exposure period at the image sensor, the start instruction unit issues an instruction for the rolling shutter control unit to start the storage control.

5. An imaging apparatus according to claim 1, wherein:
the start instruction unit also offsets start timing with which the instruction for the rolling shutter control unit to start the storage control is issued.

6. An imaging apparatus according to claim 5, wherein:
the start instruction unit adjusts the start timing so as to avoid any period of time during which the light emission cycles of the plurality of the color components do not overlap.

7. An imaging apparatus according to claim 5, wherein:
the start instruction unit adjusts the start timing in response to an operation signal output from an operation member.

8. An imaging method, comprising:
providing an image sensor equipped with a plurality of charge storage-type photoelectric conversion elements disposed along a first direction and a second direction intersecting the first direction;
providing a rolling shutter control unit that executes storage control so as to store electrical charges in a first element row and in a second element row with different timing for electrical charging, the first element row being made up with a plurality of the charge storage-type photoelectric conversion elements disposed along the first direction and the second element row being made up with a plurality of the charge storage-type photoelectric conversion elements disposed along the first direction at a different position along the second direction;

providing a detection unit that detects light emission timing indicating a light emission cycle corresponding to each of a plurality of color components contained in light entering the image sensor; and providing a start instruction unit that engages the rolling shutter control unit to start the storage control based upon the light emission timing.

9. An imaging method according to claim 8, wherein:
the detection unit detects the light emission timing in correspondence to each of the plurality of color component based upon an output from a non-storage-type photoelectric conversion element.

10. An imaging method according to claim 8, wherein:
the start instruction unit issues an instruction for the rolling shutter control unit to start the storage control so as to execute the storage control substantially halfway through the light emission cycle of the color component with a shortest light emission cycle among the plurality of the color components.

11. An imaging method according to claim 8, wherein:
when the light emission cycle of the color component with a shortest light emission cycle among the plurality of the color components is longer than an exposure period at the image sensor, the start instruction unit issues an instruction for the rolling shutter control unit to start the storage control.

12. An imaging method according to claim 8, wherein:
the start instruction unit also offsets start timing with which the instruction for the rolling shutter control unit to start the storage control is issued.

13. An imaging method according to claim 12, wherein:
the start instruction unit adjusts the start timing so as to avoid any period of time during which the light emission cycles of the plurality of the color components do not overlap.

14. An imaging method according to claim 12, wherein:
the start instruction unit adjusts the start timing in response to an operation signal output from an operation member.

* * * * *